United States Patent
Clemens et al.

(10) Patent No.: US 12,069,231 B1
(45) Date of Patent: *Aug. 20, 2024

(54) INTEGRATED DISPLAY RENDERING

(71) Applicant: Tanzle, Inc., Scotts Valley, CA (US)

(72) Inventors: Nancy L. Clemens, Scotts Valley, CA (US); Michael A. Vesely, Scotts Valley, CA (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,072

(22) Filed: Jun. 22, 2022

Related U.S. Application Data

(63) Continuation of application No. 17/092,111, filed on Nov. 6, 2020, now Pat. No. 11,375,179.

(60) Provisional application No. 63/021,568, filed on May 7, 2020, provisional application No. 62/933,269, filed on Nov. 8, 2019.

(51) Int. Cl.
   | | |
   |---|---|
   | *H04N 13/361* | (2018.01) |
   | *H04N 13/111* | (2018.01) |
   | *H04N 13/221* | (2018.01) |
   | *H04N 13/351* | (2018.01) |

(52) U.S. Cl.
   CPC ......... *H04N 13/361* (2018.05); *H04N 13/111* (2018.05); *H04N 13/221* (2018.05); *H04N 13/351* (2018.05)

(58) Field of Classification Search
   CPC .. H04N 13/361; H04N 13/351; H04N 13/111; H04N 13/221; H04N 12/351
   USPC .......................................................... 348/51
   See application file for complete search history.

(56) References Cited

U.S. PATENT DOCUMENTS

| | | | |
|---|---|---|---|
| 9,798,002 B2 * | 10/2017 | Baba | G01S 13/867 |
| 10,026,229 B1 * | 7/2018 | Yalniz | G06K 9/00671 |
| 2011/0234584 A1 * | 9/2011 | Endo | H04N 13/344 |
| | | | 345/419 |
| 2013/0093661 A1 * | 4/2013 | Ali | G06F 3/011 |
| | | | 345/156 |
| 2013/0182225 A1 | 7/2013 | Stout | |

(Continued)

OTHER PUBLICATIONS

Spindler et al., "Use your head: Tangible windows for 3D information spaces in a tabletop environment," ITS '12: Proceedings of the 2012 ACM International Conference on Interactive Tabletops and Surfaces, Nov. 2012, 245-254.

(Continued)

*Primary Examiner* — Tung T Vo

(74) *Attorney, Agent, or Firm* — Fish & Richardson P.C.

(57) ABSTRACT

A system, method or compute program product for displaying a first image based on first image data in a display area of a first display device, receiving at least one camera-captured second image of an environment with the second image capturing at least a portion of the first image displayed in the display area, determining a location and orientation of the first display device relative to the camera, determining a portion of the second image that corresponds to the portion of the first image displayed in the display area, generating a third image that corresponds to the portion of the first image displayed on the first display device as viewed from a point of view of the camera from the first image data, and generating a composite image of the environment by replacing at least a portion of the second image with the third image, and displaying the composite image.

22 Claims, 8 Drawing Sheets

(56) References Cited

U.S. PATENT DOCUMENTS

| | | |
|---|---|---|
| 2014/0118506 A1 | 5/2014 | Uhl |
| 2014/0306995 A1 | 10/2014 | Raheman et al. |
| 2015/0054823 A1 | 2/2015 | Dzhurinskiy et al. |
| 2015/0125045 A1* | 5/2015 | Gauglitz ................. G06T 7/579 |
| | | 382/107 |
| 2015/0348326 A1 | 12/2015 | Sanders et al. |
| 2016/0110848 A1* | 4/2016 | Gray .................. H04N 5/23222 |
| | | 382/173 |
| 2016/0147492 A1* | 5/2016 | Fugate .................... G09G 3/001 |
| | | 345/633 |
| 2016/0358383 A1* | 12/2016 | Gauglitz ............... G06T 19/006 |
| 2018/0205940 A1 | 7/2018 | Donovan |
| 2018/0288320 A1* | 10/2018 | Melick .................... G01S 17/86 |
| 2019/0034742 A1* | 1/2019 | Gokan ...................... B60T 7/12 |
| 2019/0071074 A1* | 3/2019 | Gokan ............... G06K 9/00805 |
| 2019/0102949 A1 | 4/2019 | Sheftel et al. |
| 2020/0394012 A1* | 12/2020 | Wright, Jr. .............. G06F 3/167 |

OTHER PUBLICATIONS

Lu et al., "A Survey of Motion-Parallax-Based 3-D Reconstruction Algorithms," IEEE Transactions on Systems, Man, and Cybernetics-Part C: Applications and Reviews, 34(4):532-548, Nov. 2004.

* cited by examiner

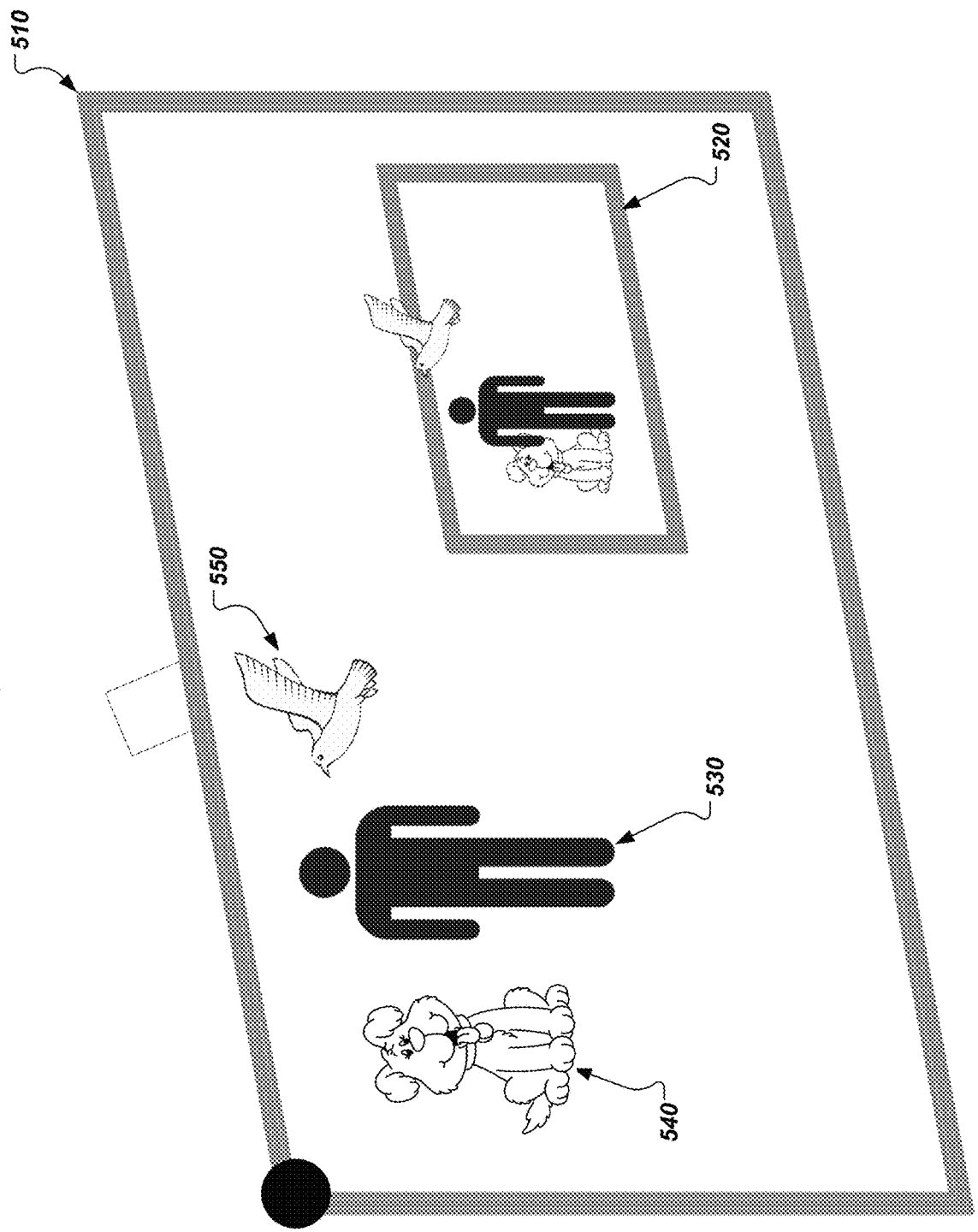

INTEGRATED DISPLAY RENDERING

CROSS-REFERENCE TO RELATED APPLICATIONS

This application is a continuation of U.S. application Ser. No. 17/092,111, filed on Nov. 6, 2020, which claims priority to U.S. Application No. 63/021,568, filed on May 7, 2020, the disclosures of which are incorporated by reference. This application also claims priority to U.S. Application No. 62/933,269, filed on Nov. 8, 2019, the disclosure of which is incorporated by reference.

BACKGROUND

Technical Field

This disclosure relates to a three-dimensional display system, and in particular, to a display process to render display devices in a visualized three dimensional space.

Description of Related Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g., paintings, drawings, tapestries, etc.).

The two dimensional pictures must provide a numbers of cues of the third dimension to the brain to create the illusion of three dimensional images. This effect of third dimension cues can be realistically achievable due to the fact that the brain is quite accustomed to it. The three dimensional real world is always and already converted into two dimensional (e.g., height and width) projected image at the retina, a concave surface at the back of the eye. And from this two dimensional image, the brain, through experience and perception, generates the depth information to form the three dimension visual image from two types of depth cues: monocular (one eye perception) and binocular (two eye perception). In general, binocular depth cues are innate and biological while monocular depth cues are learned and environmental.

A planar stereoscopic display, e.g., a LCD-based or a projection-based display, shows two images with disparity between them on the same planar surface. By temporal and/or spatial multiplexing the stereoscopic images, the display results in the left eye seeing one of the stereoscopic images and the right eye seeing the other one of the stereoscopic images. It is the disparity of the two images that results in viewers feeling that they are viewing three dimensional scenes with depth information.

SUMMARY

In one aspect, a computer program product, method or display system will display a first image in a display area of a first display device, the first image based on first picture data; receive at least one camera-captured second image of an environment, the second image capturing at least a portion of the first image displayed on the display area of the first display device; determine a location and orientation of the first display device relative to the camera; determine a portion of the second image that substantially corresponds to the portion of the first image displayed by the first display device; based on the location and orientation of the first display device with respect to the camera, generate a third image rendered from the first picture data, wherein the third image substantially corresponds to the portion of the first image displayed on the first display device as viewed from a point of view of the camera; generate a composite image of the environment by replacing the portion of the second image with the third image; and display the composite image on a second display device.

Implementations may include one or more of the following.

The first image may be a monoscopic image. Generating the third image may include generating a stereoscopic image. The first image may be a stereoscopic image. Generating the third image may include generating a monoscopic image.

Generating the third image may include receiving the first image and applying one or more of translation, rotation, skewing or scaling to the first image. Generating the third image may include receiving the first picture data and rendering the third image from the first picture data based on the location and orientation of the first display with respect to the camera.

Determining the location and orientation of the first display relative to the camera may include receiving signals from a tracking system that tracks the first display and the camera. Determining the location and orientation of the first display relative to the camera may include processing the second image to identify a reference object in the second image.

Which data source out of a plurality of data sources is a source for rendering the image on the first display may be determined.

Determining the portion of the second image that corresponds to the portion of the first image displayed by the first display device may include determining the portion of the second image using one or more of (i) image recognition techniques, (ii) detection of markers on the first display device indicating the portion, or (iii) the tracked determined location and orientation of the first display device relative to the camera. The image recognition techniques may include one or more of (i) recognizing a shape of the display area of the first display device, (ii) recognizing motion of images depicted on the display area of the first display device, or (iii) comparing the first image and the second image.

Generating a third image rendered from the first picture data may include obtaining buffer data of the first display device, and applying one or more transformations on the buffer data of the first display device to generate the third image. Generating a third image rendered from the first picture data may include obtaining model data representing a three-dimensional model of a virtual object rendered in the first image, generating an initial third image by processing the model data, and applying one or more transformations on the initial third image to generate the third image.

The first picture data may be obtained from one or more of (i) a camera corresponding to the first display device, or (ii) an image processing system that generated the first image.

In another aspect, a computer program product, method or display system will obtain a first image depicting an environment, wherein the first image includes a rendering of a display device that is displaying a second image, and wherein the first image has been captured by a camera; determine a respective location and orientation of the display device and the camera in the environment; determine a plurality of first pixels in the first image that depict the display device; generate a plurality of second pixels that depict the second image displayed on the display device from a point of view of the camera, using the respective location and orientation of the display device and the camera; and generate a composite image that depicts the environment, comprising replacing the plurality of first pixels in the first image with the plurality of second pixels.

Implementations may include one or more of the following. The first image may include a first portion corresponding to the display device, and a non-overlapping second portion corresponding to a region of the environment outside the display device. A portion of the first image corresponding to the second image displayed by the display device may be less than the entire first image.

Particular embodiments of the subject matter described in this specification can be implemented so as to realize one or more of the following advantages. Higher quality stereoscopic images can be generated. In particular, using techniques described in this specification, a system can generate a composite image of an environment by processing a first image of the environment that includes a rendering of a second image being displayed on a display device. The portion of the image corresponding to the second image as captured by the camera can be replaced by a corresponding second image generated from source data, thus reducing imaging artifacts, e.g., glare or poor resolution of the camera.

BRIEF DESCRIPTION OF THE DRAWINGS

A better understanding of the present disclosure can be obtained when the following detailed description of the preferred embodiment is considered in conjunction with the following drawings, in which:

FIGS. 5A and 5B present an example first display depicting a second display;

DETAILED DESCRIPTION

Figure 1:
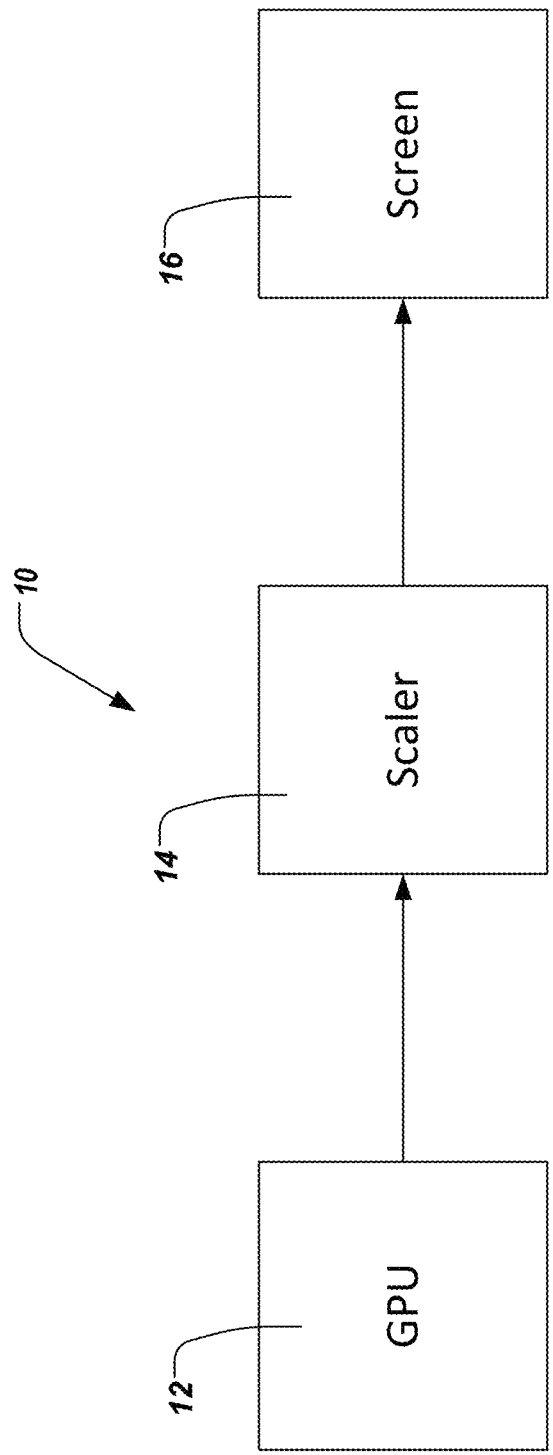
FIG. 1 presents a prior art display chain.

FIG. 1 illustrates a typical conventional display chain 10, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.
2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.
3. Panel. The panel 16 is the display screen itself. In some implementations, the panel 16 can be a liquid crystal display (LCD) screen. In some other implementations, the panel 16 can be a component of eyewear that a user can wear. Other display screens are possible.

Time Sequential Stereo Displays

Unlike a normal display, in a stereo display, there are two images-right and left. The right image is to be delivered to only the right eye, and the left image is to be delivered to only the left eye. In a time sequential stereo display, this separation of right and left images is performed in time, and thus, it must contain some time-dependent element which separates these two images. There are two common architectures.

Figure 2:
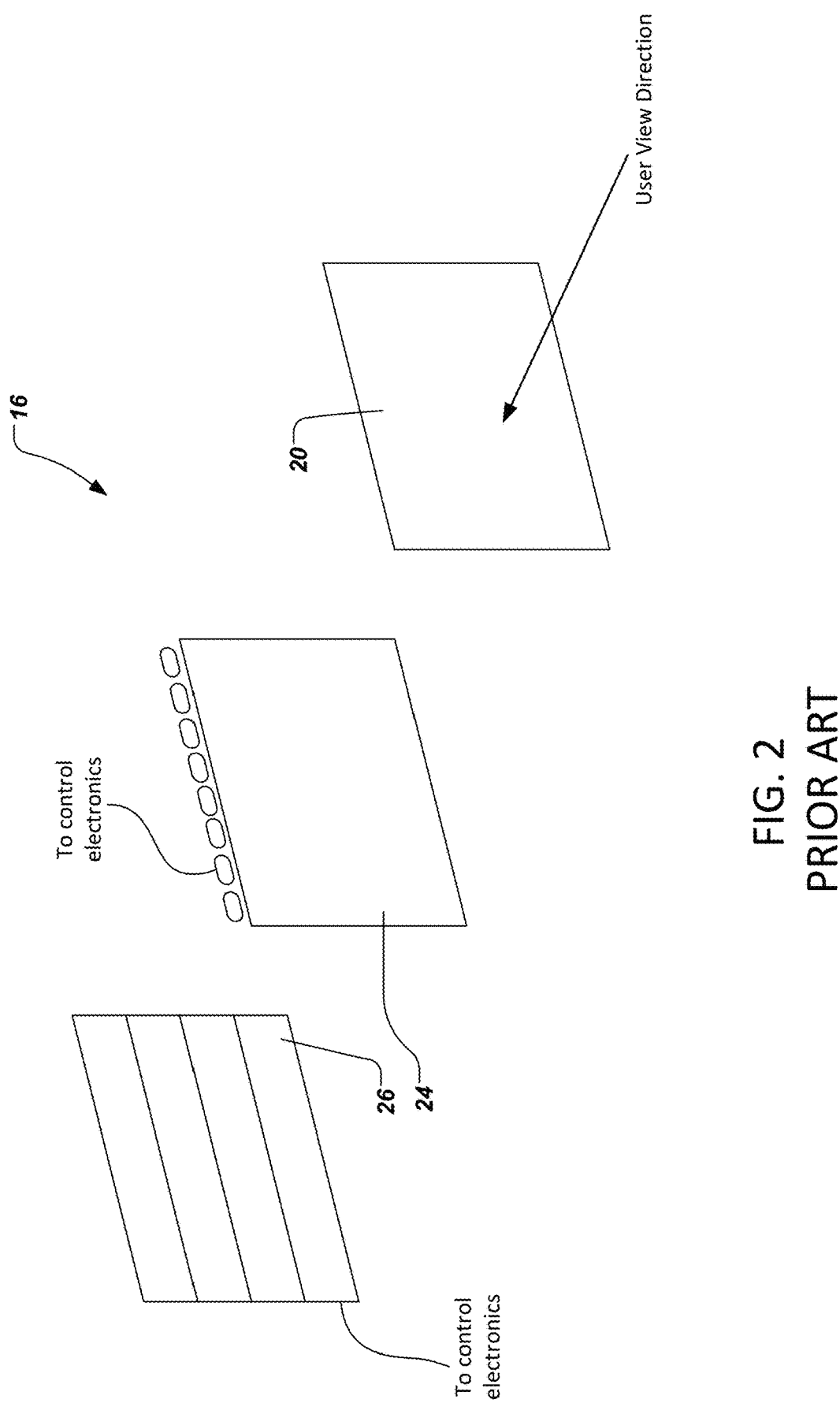
FIG. 2 presents a prior art polarization switch architecture.

The first architecture, shown in FIG. 2, uses a device called a polarization switch (PS) which may be a distinct (separate) or integrated LC device or other technology switch. The polarization switch 20 is placed in front of the display panel 24, specifically between the display panel 24 and the viewer. The display panel 24 can be an LCD panel which can be backlit by a backlight unit 26, or any other type of imaging panel, e.g., an organic light emitting diode (OLED) panel, a plasma display, etc., or any other pixelated panel display used in a time-sequential stereo imaging system. The purpose of the polarization switch 20 is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

Figure 3:
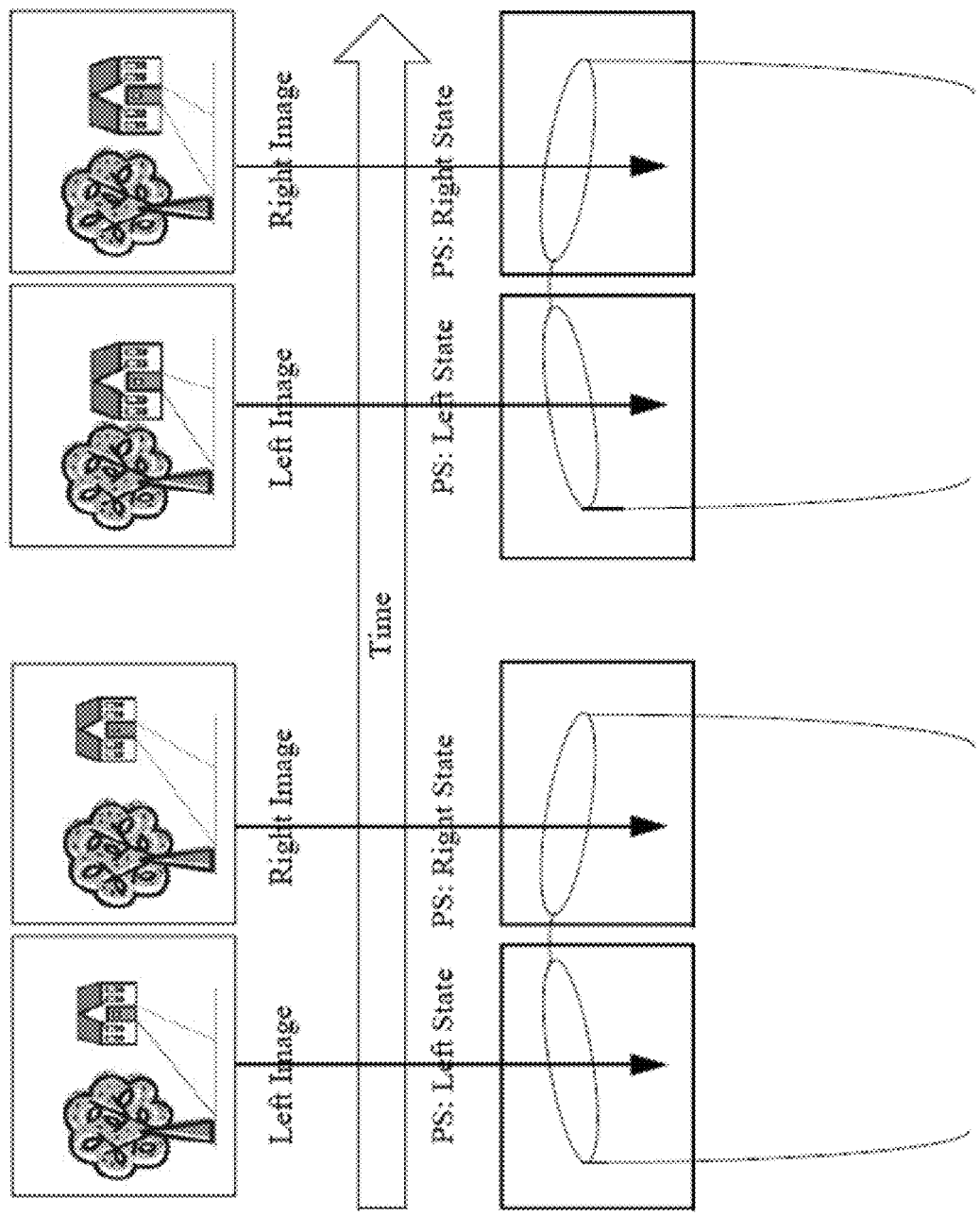
FIG. 3 presents prior art left and right switching views causing a stereo 3D effect.

This allows achievement of the stereo effect shown in FIG. 3. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization and the right lens will only pass the Right State polarization. In this way, separation of the right and left images is achieved.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

Terms

The following is a list of terms used in the present application:

Memory—may include non-transitory computer readable media, including volatile memory, such as a random access memory (RAM) module, and non-volatile memory, such as a flash memory unit, a read-only memory (ROM), or a magnetic or optical disk drive, or any other type of memory unit or combination thereof. Memory is configured to store any software programs, operating system, drivers, and the like, that facilitate operation of display system, including software applications, rendering engine, spawning module, and touch module.

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand alone display, head mounted display or as a single or multi-screen tiled array of displays. Display sizes may range from smaller handheld or head mounted display devices to full wall displays, which may or may not include an array of display devices. The display may include a single camera within a mono display device or a dual camera for a stereo display device. The camera system is particularly envisioned on a portable display device, with a handheld, head mounted, or glasses device. The camera(s) would be located within the display device to peer out in the proximity of what the user of the display device might see; that is, facing the opposite direction of the display surface.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a Memory.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers the display of a 3D object, or content, on a two dimensional (2D) display. Thus, a projection may be described as the mathematical function applied to objects within a virtual 3D scene to determine the virtual location, size, and orientation of the objects within a 3D space that may be defined by the size of the 3D stereoscopic display and the perspective of a user.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc., First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Exemplary Systems

In some 3D display environments, e.g., with composite images that have a real component and a virtual component, a camera will capture an image of a real environment, generate a modified scene, e.g., by adding a virtual object to the image of the real environment, and stereoscopically display the modified scene to the user. The image actually presented to the user, i.e., the stereoscopically displayed image, provides a first image.

In some situations, a display device, e.g., a screen of a phone, tablet, computer monitor, laptop, etc., may be present in the real environment. As a result, a second image that is being displayed on the display device can be captured by the camera and can become part of the scene being stereoscopically displayed to the user in the first image. However, the portion of the first image depicting the second image displayed by the display device will often suffer from artifacts when displayed to the user. For example, there can be a loss of resolution simply due to the distance of the display device from the camera and the relative resolution of the camera and the display device. As another example, there may be glare on the screen of the display device that causes discoloration or blurriness of the rendering of the second image in the stereoscopic display to the user. For some applications, it would be beneficial to present the image being displayed by the display device (i.e., the second image) with higher fidelity to the user of the stereoscopic display (i.e., as part of the first image).

This specification describes how a system can generate a composite monoscopic or stereoscopic image that includes a rendering of a display that is displaying another image. In particular, the system can obtain a first image, captured by a camera, of an environment that includes a display device that is displaying a second image. Alternatively, the first image could include only the display device, or only the display area of the display device where the second image is being displayed. In any event, in brief, the portion of the first image that corresponds to the second image is replaced by a rendering that is provided to or generated by the processing system and that may be a higher fidelity than what the first image would have otherwise shown.

In some implementations, the system can obtain the "original" second image, i.e., the image data that was used by the display device to render the second image on the display area of the display device. For example, if the second image is a frame of a video that is displayed as the first image, the system can obtain the frame of the video. The frame could be obtained from the display device, e.g., the data representing the frame can be copied by the display device and directed to the system. Alternatively, the data representing the frame could be obtained from the video source that provides the frame to the display device, e.g., the video source can output a copy of the data representing the frame. As another example, if the second image is itself a composite image generated from a captured image of the environment that includes one or more renderings of virtual objects, the system can obtain the data representing the composite image. Assuming the compositing is performed by the display device, i.e., the system is local to the display device, then the data representing the composite image can be obtained from the display device, e.g., the data representing the composite image can be copied by the display device and directed to the system. Alternatively, assuming the compositing is performed by a remote server, i.e., the system is non-local to the display device, then the data representing the frame could be obtained from the server, e.g., the server can output a copy of the data representing the frame.

In some other implementations, the system can generate a perspective based rendering that may be a higher fidelity version of the second image, e.g., by performing a rendering from the same source data, such as from a 3D model, that was used to generate the second image. For example, if the second image is a composite image generated from a captured image of the environment that includes one or more projection-based renderings of virtual objects, the system can obtain the original captured images and data characterizing the one or more virtual objects. The system can then generate, according to the perspective view of the first image, a new composite image characterizing the image displayed on the display device. For example, the system can obtain the respective three-dimensional models of the virtual objects from a second system that generates the composite second images displayed on the display device, and use the models to generate the new composite image. In some implementations, the system and the second system are the same; that is, the same system generates the composite second images for display on the display device and the new composite images, using the same data characterizing the virtual objects.

The system can also obtain a location and orientation of i) the camera that captured the first image at the time that the camera captured the first image, and ii) the display device. The system can use the relative or absolute locations and orientations of the camera and the display device to determine how to render the second image in the composite image. For example, the system can process the second image using one or more linear transformations, e.g., translation, scaling, or skewing, in order to project the higher fidelity version of the second image onto the region of the first image that originally depicted the second image in the first image. Thus, the system can essentially replace the rendering of the second image in the first image with the second image itself, generating the composite image and minimizing or eliminating the artifacts of the first image.

As an example, the system can maintain a model of the physical environment with virtual objects representing the camera and the display device. The location and orientation of the virtual objects representing the camera and the display device within the model can be based on the location and orientation information received by the system, e.g., from the tracking system described below.

The model can include a two-dimensional virtual object representing the display screen of the display device. The position and orientation within the virtual environment of the virtual object corresponding to the display screen can be determined based on the position and orientation of the virtual object corresponding to the display device and data stored with the virtual object representing the display device. For example, the virtual object representing the display device can include data indicating the relative position and size of the display screen relative to the frame of the display device or relative to a tracking element on the display device.

The model can include a virtual object representing the frustum viewed by the camera. The position and orientation within the virtual environment of the virtual object corresponding to the frustum can be determined based the position and orientation of the virtual object corresponding to the camera and data stored with the virtual object representing the display device. For example, the virtual object representing the display device can include data indicating the relative position and volume of the frustum relative to a tracking element on the camera.

Based on the relative positions of the virtual display screen and the virtual camera within the virtual environment of the model, the system can determine a region where the virtual display screen intersects the virtual frustum. Under the assumption that the real physical positions of the camera and display device correspond to the virtual positions within the model, through a mapping process the system can determine which portions of the first image correspond to the real display screen of the real display device. In particular, the system can assume the first image corresponds to the base of the virtual frustum, and can project the virtual display screen onto the base of the virtual frustum based on the virtual viewpoint of camera.

In addition, based on the relative positions of the virtual display screen and the virtual camera within the virtual environment of the model, the system determines a transformation to apply to the second image. As noted above, this would involve scaling, or skewing depending on the perspective based orientation of the virtual display screen within the virtual frustum and the distance of virtual display screen from the virtual viewpoint. Application of the transformation to the second image provides a transformed image that would correspond to second image as seen from the viewpoint of the camera. Then the system can project the transformed image from the surface corresponding to the virtual display screen onto the base of the virtual frustum to fill the portion of the first image corresponding to the display screen, and thus generate the composite image.

In some other implementations, the second image displayed on the display device can itself be a second composite image that depicts one or more virtual objects that are placed in a rendering of the real-world physical environment. The system can obtain data characterizing the one or more virtual objects depicted in the second image, and process the obtained data to determine how to render the rendering of the virtual objects on the rendering of the display device in the composite image. That is, the second image can contain renderings of one or more virtual objects that were rendered in the second image according to data characterizing the virtual objects; for example, for each virtual object, the data can include a three-dimensional model of the virtual object and coordinates characterizing a location and orientation of the virtual object in the real world, e.g., six-dimensional coordinates (x, y, z, pitch, yaw, roll). Using the respective location and orientation of the display device and the camera, as well as the location and orientation of the virtual objects, the system can determine how the virtual objects are depicted on the display device in the first image, i.e., how the second image depicts the virtual objects from the perspective of the camera. The system can then insert a rendering of each virtual object into the composite image according to the determined rendering of the virtual object.

In some such implementations, the generated composite image can be a stereoscopic image that include renderings of one or more virtual objects that were originally depicted in the second image, where the models of the virtual objects rendered in the generated composite image extend beyond the boundaries of the display device in the composite image in the coordinate system of the real-world environment. That is, the original first image includes a rendering of the display device that is depicting the virtual objects, and the rendering of the virtual objects are enclosed within the rendering of the frame of the display device. In the generated composite image, the rendering of the rendered virtual objects appear to be wholly or partially outside of the rendering of the display device, as if the virtual objects were extending beyond the display device into the real world.

In some such implementations, the generated composite image can be a stereoscopic dual view image displayed on the stereo view display device, that include renderings of one or more virtual objects from a 3D model that were originally depicted in the second image, where the image displayed in the second image display device was a mono-view display device. The model of the virtual objects rendered in the generated composite image is available to the processing system, so that the correct projections for each view of the dual view may be rendered and provided to the stereo display device for displaying as those pixels correlating to the captured second mono-display device display area are replaced with the correct rendered projections of the model scene as seen from the perspective of the second display device display area.

Figure 4A:
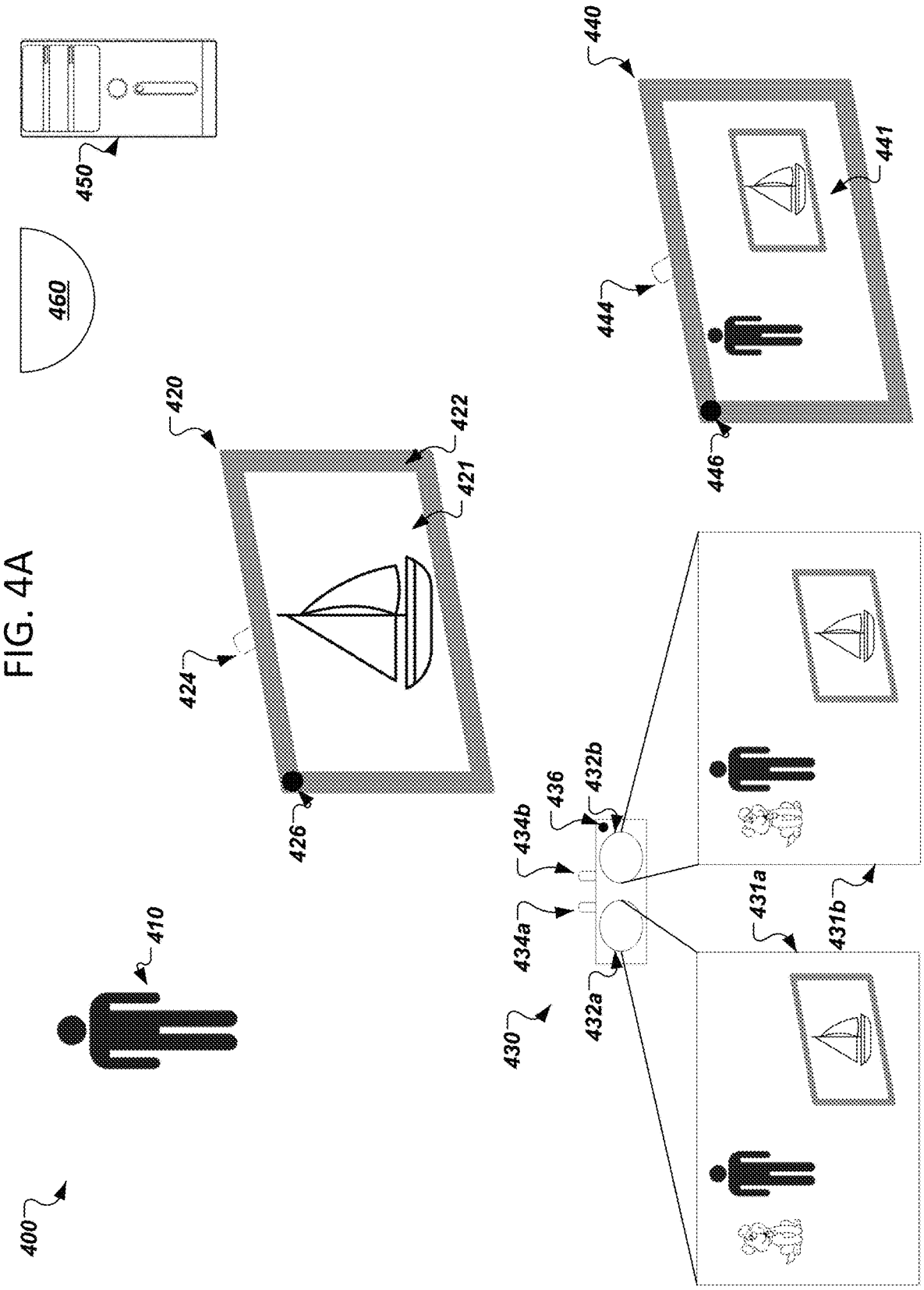
FIGS. 4A and 4B present an example system with multiple devices.

FIG. 4A illustrates an exemplary system 400 that may be configured to perform various embodiments described below. The system 400 includes a physical object 410, which in this example is a human, and a display device 420 displaying an image 421 that is unrelated to the environment of the physical object 410, which in this case is an image of a boat.

Images of a scene that includes the physical object 410 and the display device 420 can be captured by a first capture device 430 and/or a second capture device 440. That is, the "scene" is the scene from the perspective of the first capture device 430 or the second capture device 440. Note that, in some implementations, the display device 420 can capture images, e.g., using a camera 424 of the display device 420, and the capture devices 430 and 440 can display images. Here, the terms "display device" 420 and "capture devices" 430 and 440 are used for simplicity and clarity, because the capture devices 430 and 440 are capturing images of the display device 420, including capturing images that include renderings of images that are being displayed on the display device 420.

For example, the first capture device 430 and/or the second capture device 440 can capture a still image of the scene or a video of the physical (i.e., real world) scene composed of multiple frames, where the scene is from the perspective of the respective capture device and the captured still image or video includes a rendering of the display device 420. The first capture device 430 and/or the second capture device 440 can also capture a light, laser or sonic scan of the physical scene. A first image 431a and second image 431b, captured by the first capture device 430, and a third image 441, captured by the second capture device 440, are images of the physical scene before the respective images are processed by a capture processing system 450 (in one implementation, an image processing system 450) to replace the renderings in the images of the image 421 depicted on the display device 420. That is, the images 431a-b and 441 can be transmitted to the processing system 450 and stored in a memory of the processing system 450 before the processing system 450 processes the images.

In some implementations, one device can capture images of the scene, and a different device can display the images. That is, the first device 430 can be composed of two different devices, one of which captures images and the other of which displays the images; the same is true of the second device 440.

The first capture device 430 is a stereoscopic device, i.e., the first device 430 captures images of the scene and displays the images to a user in stereo; that is, the captured images are captured from two distinct perspectives, which are the perspectives of two cameras and generally correspond to the perspective of each of the user's eyes; e.g., the distance between the two cameras can be equal or approximately equal to the distance between the two eyes of the user. The first device 430 includes a first display 432a and a second display 432b. For example, the first device 430 can present the first display 432a conveying the perspective captured from a the first capture device to the left eye of a user and the second display 432b conveying the perspective captured from a the second capture device to the right eye of a user, e.g., if the first device 430 is a head-mounted display. The space between the first display 432a and the second display 432b can correlate to the separation between the two eyes of the user reflected by the capture from the two close, yet distinct perspectives.

The first capture device 430 includes a first camera 434a and a second camera 434b. In some implementations, the first device 430 can have more than two cameras. The first camera 434a and the second camera 434b are separated by a distance on the first device 430 so that the two cameras can capture the scene in stereo, correlating to the two close, but distinct perspectives. In some implementations, the separation between the first camera 434a and the second camera 434b can correlate to approximately the distance between the two eyes of the user. In some implementations, the two cameras and the two displays have the same horizontal relationship to each other, e.g., a line connecting the first display 432a and the second display 432b can be parallel to a line connecting the first camera 434a and the second camera 434b.

The first image 431a depicts the scene as it was captured by the first camera 534a. The first image 431a would have been displayed to the left eye of the user on the first display 432a if the first initial image 431a were not to be processed by the image processing system 450. The second initial image 431b depicts the scene as it was captured by the second camera 434b. The second initial image 431b would have been displayed to the right eye of the user on the second display 432b if the second initial image 431b were not to be processed by the image processing system 450.

As a particular example, the first device 430 can be virtual reality glasses with a stereo front facing camera and a stereo rendering eyewear display, e.g., Skyzone SKY02S V+™ 3D. As another example, the first device 430 can be a tablet with a stereo front-facing camera and a stereo rendering display, e.g., Rembrandt 3D™. In this case, the first display 432a and the second display 432b are the same display.

The second capture device 440 is a handheld device with a single display 442, i.e., the display 442 is monoscopic instead of stereoscopic. The second device 440 includes a camera 444 that performs a similar function to the cameras 434a and 434b of the first device 430. The third initial image 441 depicts the scene as it was captured by the camera 444. The third initial image 441 would have been displayed on the display 442 if the third initial image 441 were not processed by the image processing system 450.

For example, the second device 440 can be a smartphone or tablet running the Android, Windows, or iOS operations system that includes a display on one side and one or more cameras on the other side.

While the first device 430 both captures and displays images stereoscopically, and the second device 440 both captures and displays images monoscopically, in general a stereoscopic capture device can have a monoscopic display and a monoscopic capture device can have a stereoscopic display.

The first device 430 can also include a tracker component 436 and the second device 440 can include a tracker component 446; each tracker component can be used to track the location and orientation of the respective device in a common coordinate system of the physical system 400. In some implementations, the tracking components 436 and 446 can interact with a tracking base station 460 to determine the location and orientation of the devices continuously in real-time. The tracking base station is a master tracking device that allows every object in the system 400 that has a tracker component to have its location and/or orientation determined. In some implementations, the tracking base station 460 determines the location of each object; in some other implementations, each object determines its own location using the tracker base station 460.

In some implementations, the tracking base station 460 can determine the location of the respective devices by interacting with the tracker components. In some other implementations, the tracking components can determine their own locations by interacting with the tracking base station 460.

The tracking base station 460 allows the location and orientation of each object that has a respective tracking component to be tracked. The tracking component of a given object can have multiple photosensors that are separated by some distance. In some implementations, the tracking base station 460 emits a signal, e.g., light or sound having a certain wavelength. Each sensor in the tracking component of a given object can reflect the signal back to the tracking base station 460. The tracking base station 460 can use the multiple returned signals to determine the physical location, and orientation of the given object. For example, the tracking base station can determine the 6 degrees of freedom of the object, e.g., the x-position, y-position, z-position, pitch, yaw, and roll of the object according to a common coordinate system. The tracking base station can repeatedly perform this process in order to determine the location and orientation of the object continuously in real-time.

In some other implementations, the tracking base station 460 can emit a first signal and a second signal concurrently, e.g., if the tracking base station 460 includes two emitters that are physically separated by a distance. Each sensor in the tracking component of a given object can detect the first signal and the second signal at respective detection times, and the tracking component can use the respective detection times of each of the sensors to determine the location and orientation of the given object.

In some other implementations, the tracking base station 460 can include multiple cameras capturing images of the environment 400. The tracking base station 460 can perform object recognition on the captured images, and infer the geometry of the respective tracked objects that are recognized in the captured images.

The first device 430 and/or the second device 440 can send the respective initial captured images of the physical scene to the image processing system 450. In some implementations, the image processing system 450 can be on-site, e.g., in the same room as the devices 430 and 440. In some other implementations, the image processing system 450 can be off-site, e.g., on the cloud. In some other implementations, the image processing system 450 can be a component of the first device 430 and/or the second device 440. In other words, each of the devices can include a version of the image processing system 450, so that the initial images of the scene can be processed on-device.

The processing system 450 can identify the renderings of the image 421 displayed on the display device 420 in the initial captured images, so that the processing system 450 can replace the rendering of the image 421 in the initial captured images, but with the appropriate transformation to match the change in perspective. That is, the processing system 450 can determine portions of the initial captured images that substantially correspond to the image 421. The initial captured images can include both i) a first portion corresponding to the display area of the display device 420 and ii) a second portion corresponding to a region of the environment 400 that is outside of the display area of the display device 420. The second portion can include renderings of the object 410, etc. In this specification, a portion of an image is a group of contiguous pixels of the image.

In some implementations, the system determines portions of the initial captured images that partially, but not fully, correspond to the image 421. That is, there might be some error in the determined portions so that i) a subset of the determined portions do not correspond to the image 421, ii) the determined portions do not fully correspond to the image 421, or iii) both. There is a wide variety of potential sources of error in determining the portions of the initial captured images that correspond to the image 421. For example, if the image process system 450 processes the initial captured images using a machine learning model, then the machine learning model might have imperfect accuracy, e.g., an accuracy of 0.95 or 0.99. As another example, if the image processes system 450 determines the portions using the respective tracking components of the objects in the system 400, then the tracking components might have imperfect precision, e.g., precision within 1 cm or 0.1 cm. Therefore, we say that the determined portions of the initial captured image "substantially" correspond to the image 421.

For example, the processing system 450 can identify a frame 422 of the display device 420 as rendered from the captured images, e.g., using a machine learning model. The processing system can then determine that a portion of the rendering is within the identified rendering of the frame 422 of the display device 420 and corresponds to the image 421. As a particular example, the processing system 450 can select multiple "frame" pixels in the captured images that the processing system 450 determines are depicting the frame 422 of the display device 420; this process is described in more detail below. The processing system 450 can then determine multiple "image" pixels that are enclosed by the "frame" pixels in the captured images, and determine that the "image" pixels depict the image 421.

In some such implementations, the frame 422 of the display device 420 might have one or more visible markers, e.g., markers of a different color than the rest of the frame 422. The image processing system 450 can process the captured images to detect the visible markers, and then determine the "frame" and "image" pixels according to the detected markers.

In some other implementations, the image processing system 450 can process the captured images using a machine learning algorithm to detect the frame 422 of the display device 422, e.g., an object detection machine learning model that has been configured through training to process an image and select a region of the image that depicts a frame of a display device.

In some other implementations, the image processing system 450 can process a sequence of multiple initial images of the environment 400 captured in consecutive time points by the same device 430 or 440. Pixels depicted images on a display screen, e.g., the display screen 421 of the display device 420, can move faster than pixels depicted other objects in the environment because the scale is smaller. For example, if the device 420 is capturing a video of the object 410 and displaying the video on the display screen 421, then a movement of the object 410 will cause the pixels of the captured initial images depicting the display screen 421 to change more significantly than pixels depicting the original object 410, because the object 410 is depicted on the display screen 421 on a reduced scale. Thus, the system 450 can process the multiple consecutive images to identify the "image" pixels to be the pixels that experience the most movement between the consecutive captured initial images.

In some other implementations, the image processing system 450 can obtain metadata of the display device 420 that defines dimensions and product specifications of the display device 420, e.g., that defines a size and location of a display area on the display device. The image processing system 450 can then identify the display device 420 in the captured images, e.g., by identifying a barcode or RFID identification that is on the display device 420 and rendered in the captured images. The image processing system 450 can then use i) the location and orientation of the display device 420 and the respective capture device in the coordinate system of the real-world environment and ii) the metadata of the display device 420 to determine the rendering of the display area of the display device in the captured image.

In some other implementations, the display device 420 can have a measured or predetermined spatial location, shape, size, orientation, and/or volume relative to each device 430 and 440. As a particular example, as described above, the display device 420 and capture devices 430 and 440 can each have tracking components 426, 436, and 446, respectively, that can be used to track the locations and orientations of the devices in a common physical coordinate system of the real-world system 400.

The processing system 450 can obtain i) the measured locations and orientations of the display device 420 and the capture devices 430 and 440 and ii) camera data that describes the cameras of the capturing devices 430 and 440, and use the camera data and the measured locations and orientations to identify the display device 420 in the captured images. For example, the camera data can define, for any location and orientation of the capture devices 430 and 440, a field of view of the cameras of the capture devices 430 and 440, e.g., by defining one or more of a focal length, resolution, focal length, or aspect ratio of the camera. Thus, given a location and orientation of a capture device, e.g., the capture device 440, the camera data can define a one-to-one relationship between i) the tracked location and orientation of the display device 420 and ii) the rendering of the display device in an image captured by the capture device 440; that is, the processing system 450 can directly determine the rendering of the image 421 within the captured image of the capture device 430 or 440 using i) the camera data and ii) the relative or absolute locations and orientations of the display device 420 and the respective capture device 430 or 440.

The image processing system 450 can maintain a database of the displays in the environment that identifies the data source for each display, e.g., a video feed with a particular source, a 3D model with a particular viewpoint, etc. The image processing system 450 can select a data source corresponding to the source used by the display device 420, and then use that data source for generation of the rendering that is to be used in the composite image. For example, the tracking components can generate a signal that includes an identification code that is unique to the particular component. When the image processing system 450 receives the signal, it can determine which data source to use based on the identification code and the database.

In some other implementations, the image processing system 450 can process the captured images using a machine learning algorithm to detect the image 421 within the captured images. For example, the image processing system 450 can determine the image 421 that was displayed on the device 420 at the time the images were captured, and compare the image 421 with the captured images.

The image processing system 450 can obtain the image 421 that includes a rendering of the scene, e.g., comprising the boat, displayed on the display device 420, and process i) the image 421 and ii) the identified rendering of the image 421 in the captured image of the capture devices 430 and 440 to generate a composite image for each captured image 431a, 431b, and 441 that replaces the rendering of the image 421 in the original captured images 431a, 431b, and 441 with the image 421 itself, removing artifacts in the rendering of the image 421.

For example, the processing system 450 can process the image 421 using one or more linear transformations, e.g., translation, scaling, or skewing, in order to project the image 421 onto the regions of the captures images that originally depicted the image 421 displayed on the display device 420, thus generating a composite image for each captured image. The linear transformations for projecting the image 421 onto a particular captured image can be determined according to i) the relative locations and orientations of the display device 420 and the capturing device that captured the particular captured image and ii) the identified rendering of the image 421 in the particular captured image. For example, the processing system 450 can determine a two-dimensional translation of the image 421 according to the location of the rendering of the image 421 in the particular captured image from the perspective of the capture devices 430 or 440; a scaling value according to the measured distance between the display device 420 and the capture device and/or according to the size of the rendering of the image 421 in the particular captured image; a skewing value according to the perspective of the capture device and the location and/orientation of the display device 420; and a three-dimensional rotation, e.g., (pitch, yaw, roll), of the image 421 according to the relative measured orientations of the display device 420 and the capture device.

Thus, the system can essentially replace the rendering of the image 421 in each captured image with the image 421 itself, generating composite images. That is, the system can replace the pixels in the captured images representing the screen area of the display device 420 that display the image 421 with the translated source image rendering of the image 421 displayed on the display device 420 which minimizes or eliminates the artifacts that would be in the captured images if the processing system 450 were not to perform the pixel replacement in the frame buffers 431a-b and 441.

In some implementations, the system can combine, or blend, i) the pixels in the captured images representing the screen area of the display device 420 and ii) the generated image rendering of the image 421. For example, for each particular pixel in the generated image rendering of the image 421, the system can determine an updated pixel value to be a linear combination of i) the original value of the particular pixel in the generated image rendering, and ii) one or more pixel values in the captured images representing the screen area of the display device 420 that correspond to the particular pixel. For example, the system can determine a neighborhood of pixels in the captured images that depict the same location in the environment 400 as the particular pixel, and blend the determined neighborhood of pixels with the particular pixel to generate the updated pixel value.

As another example, the system can use the pixels in the captured images represented the screen area of the display device 420 to perform one or more error checking methods on the generated image rendering of the image 421. For example, the system can process both images using a machine learning model that is configured to generate a model output characterizing a similarity between the two images. If the predicted similarity is above a particular threshold, then the system can determine that the generated image rendering of the image 421 accurately depicts the pixels in the captured images representing the screen area of the display device 420. If the predicted similarity is below the particular threshold, then the system can determine that an error has occurred in generating the image rendering of the image 421, and can process the generated image rendering of the image 421 to determine the dissimilarity.

The processing system 450 can then provide the composite images to the devices 430 and 440 for displaying to users. That is, the devices 430 and 440 can display the composite images instead of the original captured images, so that the user enjoys a superior user experience with fewer artifacts.

The image processing system 450 can repeatedly perform this process in order to generate processed images for each frame of the captured images in real time, so that the user can view the processed frames in real-time. In particular, if the user moves the first capture device 430 or the second capture devices 440, the image processing system 450 will continuously generate images that depict the display device 420 from updated newly determined different locations and orientation angles. Similarly, if the a user moves the display device 420 within the scene, then the image processing system 450 will re-determine the correct location and orientation of the image 421 within each of the composite images 431a-b and 441 accordingly.

Figure 4B:
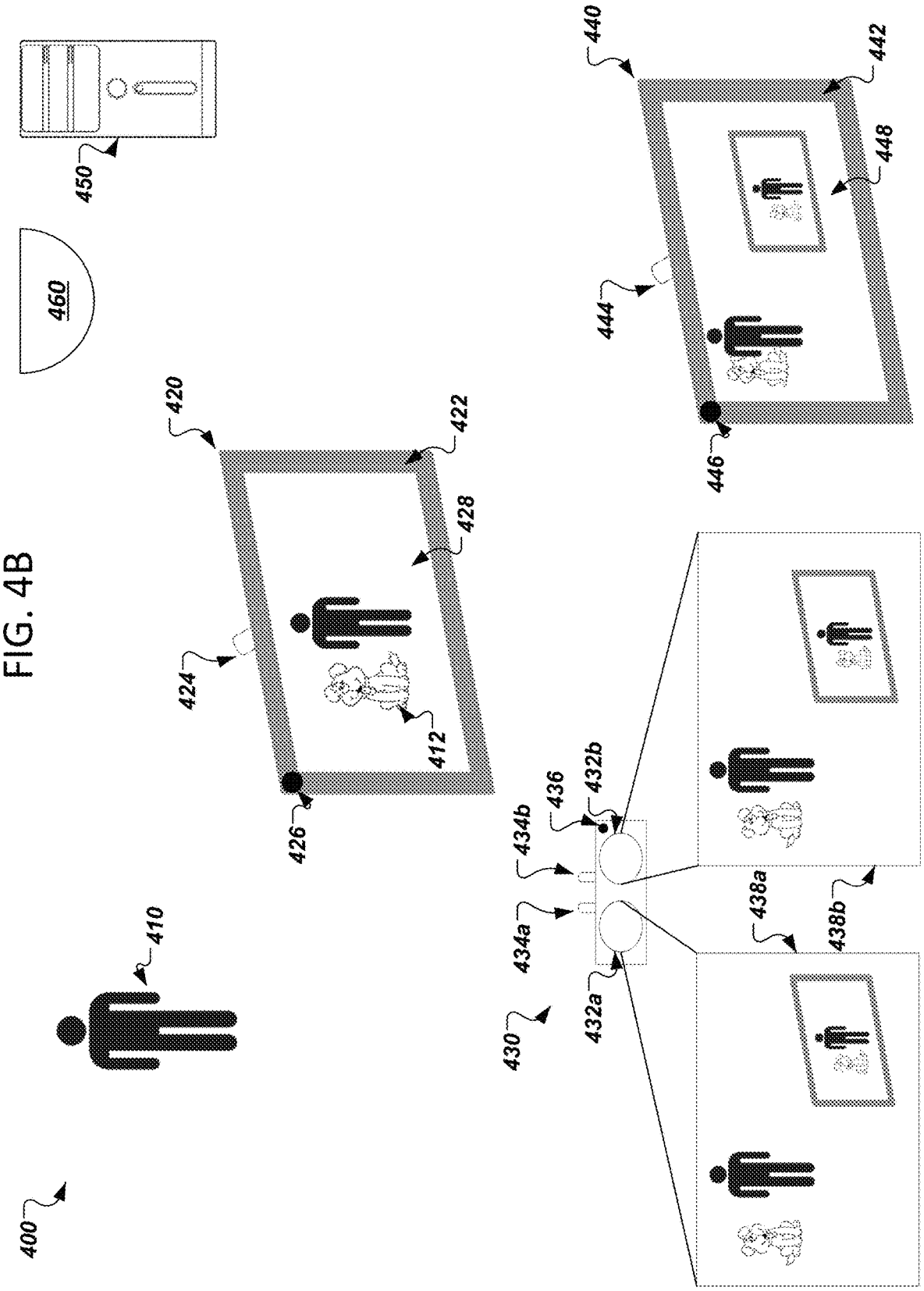

FIG. 4B shows the same system 400 that was shown in FIG. 4A. In this example, the image that is displayed on the display device 420 is itself a composite image captured of a scene in the system 400, namely, a scene from the perspective of the display device 420 that includes the physical object 410. That is, the display device 420 is capturing an initial image that depicts a scene including the physical object 410, and the capture devices 430 and 440 are both capturing respective initial images that depict a scene including the physical object 410 and the display device 420.

Further, the final images that are being displayed for users on the respective devices are composite images that include a rendering of a virtual object 412, namely, a virtual dog, inserted into the respective rendered scene of the composite image.

As described above with reference to FIG. 4A, each device 420, 430, and 440 can send the respective captured image to the processing system 450 to generate the composite images that will be displayed to the users of the system 400. In particular, the processing system 450 can i) process the initial image captured by the display device 420 to generate a composite image 428 that includes a rendering of the virtual object 412, ii) process the initial images captured by the first capture device 430 to generate composite images 438a and 438b that each include a rendering of the virtual object 412 and a composite rendering of the image 428 displayed on the display device 420, and iii) process the initial image captured by the second capture device 430 to generate a composite image 448 that includes a rendering of the virtual object 412 and a composite rendering of the image 428 displayed on the display device 420. As described above with reference to the image 421 of the boat depicted in FIG. 4A, the composite renderings of the image 428 displayed on the display device 420 that are rendered on the composite images 438a-b and 448 can be of higher quality than the original rendering of the display device 420 in the initial captured images.

In order to insert the rendering of the virtual object 412 into each composite image, the processing system 450 can maintain a three-dimensional model of the virtual object 412 that includes a location and orientation of the virtual object 412 in a common coordinate system of the system 400. For example, the model of the virtual object 412 can include dimensions, a location, and an orientation of the virtual object 412 in a model coordinate space, and the processing system 450 can maintain a one-to-one mapping from the model coordinate space to the physical coordinate space of the system 400, so that the processing system 450 can determine a location and orientation of the virtual object 412 as rendered in an image of the real-world environment.

As described above with reference to FIG. 4A, the image processing system can also obtain the locations and orientation of each device 420, 430, and 440 in the common coordinate system of the system 400, e.g., from the tracking base station 460. The image processing system 450 can then process the initial images captured by each device in order to insert a rendering of the virtual object 412 into the final images 428, 438*a*-*b*, and 448, using i) the location and orientation of the devices and ii) the maintained model of the virtual object 412. In particular, for each initial image, the processing system can determine a region of the initial image corresponding to the location of model of the virtual object in the common coordinate system of the system 400; that is, using i) the location and orientation of the maintained model of the virtual object 412 corresponding to the physical coordinate system of the system 400 and ii) the location and orientation of the respective device that captured the initial image, the processing system 450 can determine a portion of the initial image that corresponds to the model of the virtual object 412. The processing system 450 can then project an image of the virtual object 412 onto the determined portion of the initial image according to the respective orientations of the model of the virtual object 412 and the device that corresponds to the initial image; that is, the processing system 450 can insert a rendering of the virtual object 412 into the initial image so that the rendering of the virtual object 412 is from the perspective of the respective device that captured the initial image in the physical coordinate system of the system 400.

Before, after, or in parallel with inserting a rendering of the virtual object 412 into the initial images corresponding to the capture devices 430 and 440, the processing system 450 can insert a composite rendering of the image 428 displayed on the display device 420 into the initial images captured by the capture devices 430 and 440. In some implementations, the processing system 450 can project the composite image 428 itself onto the images 438*a*-*b* and 448; this process is the same as the one described above with respect to the image 421 of the boat in FIG. 4A. In some other implementations, the processing system 450 can use i) the initial image captured by the display device 420 (i.e., the image that did not include the virtual object 412) and ii) the maintained model of the virtual object 412 in order to generate the composite rendering of the image 428.

In particular, the processing system can first project the initial image captured by the display device 420 onto the composite images 438*a*-*b* and 448, as described above with respect to FIG. 4A. At this point, the composite images 438*a*-*b* and 448 include a rendering of the display device 420 that has removed any artifacts in the initial images captured by the capture devices 430 and 440, but that do not include a rendering of the virtual object 412.

The processing system 450 can then use the maintained model of the virtual object 421 to determine how to render the rendering of the virtual object 421 on the rendering of the display device 420 in the composite images 438*a*-*b* and 448. That is, the processing system 450 can project an image of the virtual object 412 onto the composite rendering of the image 428 in the images 438*a*-*b* and 448 so that it appears, from the point of view of the respective capture device, as if the virtual object 412 is in the scene that is being captured by the display device 420.

Projecting an image of the virtual object 412 directly onto the composite rendering of the image 428 of a composite image can be particularly effective if the composite image is a stereoscopic image, e.g., the images 438*a*-*b*. If the processing system 450 inserts the image 428 directly into the composite images 438*a*-*b*, then both composite images will have the same composite rendering of the image 428, even though the two composite images are from slightly different perspectives. On the other hand, the processing system 450 inserts the initial image captured by the display device 420 into the composite images 438*a*-*b*, and then the processing system 450 can project a slightly different image of the virtual object 412 onto the two composite images 438*a*-*b*, each from the perspective of the camera 434*a* or 434*b* that captured the respective initial image. Thus, instead of appearing "flat" because the two composite renderings are the same, the composite rendering of the image 428, from the point of view of the user, can appear to have a three-dimensional virtual object 412, because the virtual object 412 was projected onto the composite rendering from two different perspective points of view.

The processing system 450 can provide the composite images to the devices 420, 430, and 440 for displaying to users. As describe above, the image processing system 450 can repeatedly perform this process in order to generate processed images for each frame of a video, so that the user can view the processed frames in real-time.

Example composite renderings of the image 428 are described in more detail below in reference to FIGS. 5A and 5B.

Figure 5A:
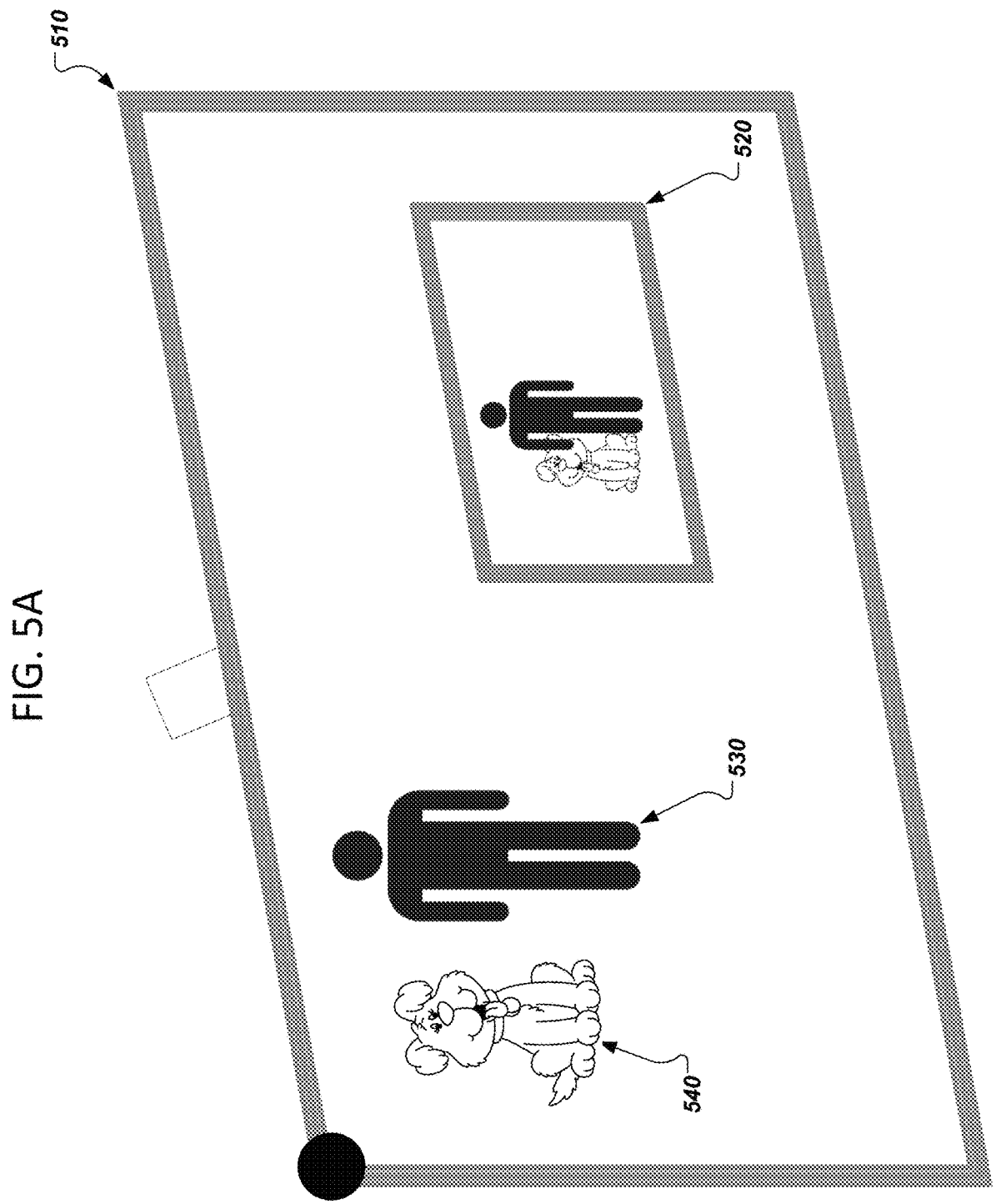

FIG. 5A presents an example first display 510 displaying an image that includes a composite rendering of an image displayed on a second display 520. The second display 510 is capturing an initial image of a scene that includes a physical object 530, and displaying a composite image that has been generated from the initial image that includes a virtual object 540. The first display 510 is capturing an initial image of a scene that includes the physical object 530 and the second display 520, and displaying a composite image that has been generated from the initial image that includes a virtual object 540, as well as a composite rendering of the image displayed on the second display 520. Each composite image can be generated by an image processing system, e.g., the processing system 450 depicted in FIGS. 4A and 4B.

The composite image displayed on the first display 510 depicts the virtual object 540 in the scene from the perspective point of view of the first display 510; namely, from the left side of the dog, and with the dog in full view. The composite image displayed on the first display 510 also depicts the virtual object as it would be captured and displayed by the second display 520, i.e., on the second display 520 from the perspective point of view of the second display 520; namely, from the right side of the dog and with the dog partially obscured by the human.

FIG. 5B presents the same example first displays 510 and 520 depicted in FIG. 5A. As in FIG. 5A, the first display 510 is displaying an image that includes a composite rendering of an image displayed on the second display 520. In particular, the image displayed on display 510 is stereoscopic.

In the example of FIG. 5B, the scene includes a second virtual object 550, namely a bird. The composite image displayed on the first display 510 depicts the virtual second object 550 in the scene from the perspective point of view of the first display 510, and depicts the virtual object as it would be captured and displayed by the second display 520. Each composite image can be generated by an image processing system, e.g., the processing system 450 depicted in FIGS. 4A and 4B.

The second virtual object 550, from the point of view of the first display 510, is coming out of the second display 520. In order to achieve this, the processing system can project a model of the second display 520 directly onto the composite image displayed on the first display 510, instead of inserting the composite image displayed on second display 520 into the composite image displayed on first display 510. Thus, because the composite image displayed on the first display 510 is stereoscopic, the second virtual object 550 can appear to the user as if it is three-dimensional and coming out of the display 520. In some other implementations, the portion of the rendering of the second virtual object 550 that is within the rendering of the second display 520 (i.e., the lower half of the rendering of the bird) displayed on the first display 510 is the original rendering of the second display 520 as captured by the first display 510, while the portion of the rendering of the second virtual object 550 that is outside of the rendering of the second display 520 (i.e., the upper half of the rendering of the bird) displayed on the first display 510 is a composite rendering generated by the processing system using the virtual model of the second virtual object 550 and inserted in the image that is displayed on the first display 510.

Exemplary Process

Figure 6:
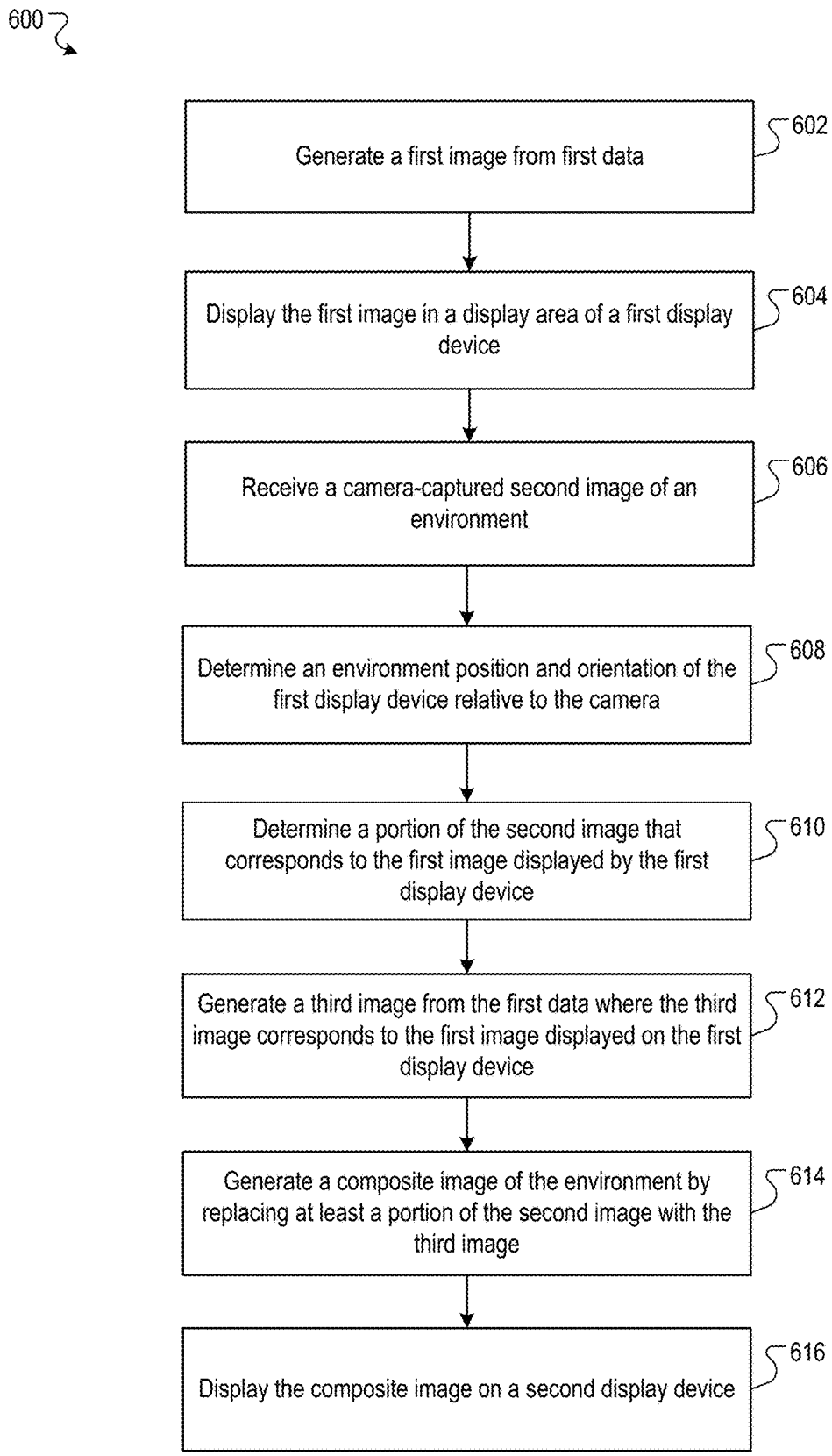
FIG. 6 is a flow diagram of an example process for generating a composite image.

FIG. 6 is a flow diagram of an example process 600 for generating a composite image from a first image that includes a rendering of a second image displayed on a display device. For convenience, the process 600 will be described as being performed by a system of one or more computers located in one or more locations. For example, a processing system, e.g., the processing system 450 of FIGS. 4A and 4B, appropriately programmed in accordance with this specification, can perform the process 600. As another example, a stereoscopic or monoscopic device, e.g., the first device 430 or the second device 440 of FIGS. 4A and 4B, appropriately programmed in accordance with this specification, can perform the process 600. In some implementations, a subset of steps of the process 600 can be performed by a processing system that is separate from a stereoscopic or monoscopic device, and the remaining steps of the process 600 can be performed on-device by the respective stereoscopic or monoscopic device.

The system generates a first image from first data (step 602). The first image can be a monoscopic or a stereoscopic image.

The system displays the first image in a display area of a first display device (step 604).

The system receives a camera-captured second image of an environment (step 606). The second image can captures at least a portion of the first image displayed on the first display device.

The system determines an environment location and orientation of the first display device relative to the camera (step 608). For example, environment location and orientation can be a six-degree location and orientation, e.g., (x, y, z, pitch, yaw, roll) in a coordinate system of the environment. The environment location and orientation can be received from a tracking system.

The system determines a portion of the second image that corresponds to the first image displayed by the first display device (step 610). That is, the portion of the second image can depict the first image displayed on the first display device. For example, the system can identify multiple pixels in the second image that depict the perimeter of the display of the first display device that is displaying the first image. The system can then determine that the identified pixels and/or the pixels in the second image within the perimeter of the identified pixels to correspond to the first image. As a particular example, as described above, the perimeter of the display of the first display can be a predetermined color, shape, or otherwise identifiable by the system.

The system generates a third image from the first data where the third image corresponds to the first image displayed on the first display device (step 612). The system can generate the third image based on the environment location and orientation of the first display device with respect to the camera. The third image can be a monoscopic image or a stereoscopic image.

The system generates a composite image of the environment by replacing at least a portion of the second image with the third image (step 614). For example, as described above, the system can replace the pixels in the second image identified in step 610 that correspond to the first image with the pixels of the third image generated in step 612 in order to generate the composite image.

The system displays the composite image on a second display device (step 616). The second display device can be the same as the first display device, or a different display device.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer program product, tangibly embodied in non-transitory computer readable media, comprising instructions to cause one or more processors to:
   receive a camera-captured first image of an environment, the first image capturing at least a portion of a second image displayed at a particular location and orientation in the environment relative to the camera, the portion of the second image illustrating a particular content;
   determine a portion of the first image that substantially corresponds to the portion of the second image;
   based on the particular location and orientation of the second image relative to the camera, generate a third image that illustrates the particular content of the portion of the second image from a point of view of the camera, wherein the third image has a higher fidelity to the second image than the portion of the first image;
   generate a composite image of the environment by replacing the portion of the first image with the third image; and
   display the composite image on a display device.

2. The computer program product of claim 1, wherein:
   the first image is a monoscopic image and the instructions to generate the third image comprise instructions to generate a stereoscopic image; or
   the first image is a stereoscopic image and the instructions to generate the third image comprise instructions to generate a monoscopic image.

3. The computer program product of claim 1, wherein the instructions to generate the third image comprise one or more of:
   instructions to receive, from a first data source, the second image and apply one or more of translation, rotation, skewing, or scaling to the second image; or
   instructions to receive, from a second data source, picture data representing the second image and render the picture data based on the particular location and orientation of the second image relative to the camera to generate the third image.

4. The computer program product of claim 3, wherein at least one of the first data source or the second data source is a second camera that captured the second image.

5. The computer program product of claim 1, further comprising instructions to determine the particular location and orientation of the second image relative to the camera using signals received from a tracking system that tracks one or more of the second image and the camera.

6. The computer program product of claim 1, further comprising instructions to determine the particular location and orientation of the second image relative to the camera by processing the first image to identify a reference object in the first image.

7. The computer program product of claim 1, wherein the instructions to determine the portion of the first image that substantially corresponds to the portion of the second image comprise instructions to determine the portion of the first image using one or more of (i) an image recognition technique, (ii) detection of one or more barcodes or other markers that are on a display device displaying the second image and that indicate the portion of the second image, or (iii) the particular location and orientation of the second image relative to the camera.

8. The computer program product of claim 7, wherein the image recognition technique comprises one or more of (i) recognizing a shape of a display area of the display device, (ii) recognizing motion of images depicted on the display area of the display device, or (iii) comparing the first image and the second image.

9. The computer program product of claim 1, wherein the instructions to generate the third image comprise instructions to:
obtain buffer data of a display device that is displaying the second image, and
apply one or more transformations on the buffer data of the display device to generate the third image.

10. The computer program product of claim 1, wherein the instructions to generate the third image comprise instructions to:
obtain model data representing a three-dimensional model of a virtual object depicted in the second image,
generate an initial third image by processing the model data, and
apply one or more transformations on the initial third image to generate the third image.

11. The computer program product of claim 1, wherein the particular content includes a portion of the environment and a virtual object.

12. A system comprising one or more computers and one or more storage devices storing instructions that are operable, when executed by the one or more computers, to cause the one or more computers to perform operations comprising:
receiving a camera-captured first image of an environment, the first image capturing at least a portion of a second image displayed at a particular location and orientation in the environment relative to the camera, the portion of the second image illustrating a particular content;
determining a portion of the first image that substantially corresponds to the portion of the second image;
based on the particular location and orientation of the second image relative to the camera, generating a third image that illustrates the particular content of the portion of the second image from a point of view of the camera, wherein the third image has a higher fidelity to the second image than the portion of the first image;
generating a composite image of the environment by replacing the portion of the first image with the third image; and
displaying the composite image on a display device.

13. The system of claim 12, wherein:
the first image is a monoscopic image and the instructions to generate the third image comprise instructions to generate a stereoscopic image; or
the first image is a stereoscopic image and the instructions to generate the third image comprise instructions to generate a monoscopic image.

14. The system of claim 12, wherein generating the third image comprises one or more of:
receiving, from a first data source, the second image and applying one or more of translation, rotation, skewing, or scaling to the second image; or
receiving, from a second data source, picture data representing the second image and rendering the picture data based on the particular location and orientation of the second image relative to the camera to generate the third image.

15. The system of claim 14, wherein at least one of the first data source or the second data source is a second camera that captured the second image.

16. The system of claim 12, the operations further comprising determining the particular location and orientation of the second image relative to the camera using signals received from a tracking system that tracks one or more of the second image and the camera.

17. The system of claim 12, the operations further comprising determining the particular location and orientation of the second image relative to the camera by processing the first image to identify a reference object in the first image.

18. The system of claim 12, wherein determining the portion of the first image that substantially corresponds to the portion of the second image comprises determining the portion of the first image using one or more of (i) an image recognition technique, (ii) detection of one or more barcodes or other markers that are on a display device displaying the second image and that indicate the portion of the second image, or (iii) the particular location and orientation of the second image relative to the camera.

19. The system of claim 18, wherein the image recognition technique comprises one or more of (i) recognizing a shape of a display area of the display device, (ii) recognizing motion of images depicted on the display area of the display device, or (iii) comparing the first image and the second image.

20. The system of claim 12, wherein generating the third image comprises:
obtaining buffer data of a display device that is displaying the second image, and
applying one or more transformations on the buffer data of the display device to generate the third image.

21. The system of claim 12, wherein generating the third image comprises:
obtaining model data representing a three-dimensional model of a virtual object depicted in the second image,
generating an initial third image by processing the model data, and
applying one or more transformations on the initial third image to generate the third image.

22. The system of claim 12, wherein the particular content includes a portion of the environment and a virtual object.

\* \* \* \* \*